United States Patent [19]

Herzog et al.

[11] Patent Number: 4,972,007

[45] Date of Patent: Nov. 20, 1990

[54] USE OF CELLULOSE DERIVATIVES IN DRILLING FLUIDS

[75] Inventors: Dieter Herzog; Bernd Schriewer, both of Walsrode, Fed. Rep. of Germany

[73] Assignee: Wolff Walsrode AG, Walsrode, Fed. Rep. of Germany

[21] Appl. No.: 282,166

[22] Filed: Dec. 9, 1988

[30] Foreign Application Priority Data

Dec. 11, 1987 [DE] Fed. Rep. of Germany ....... 3742105

[51] Int. Cl.$^5$ ...................... C09K 7/00; C08B 11/193; C08B 11/00; C08B 11/12
[52] U.S. Cl. .................................... 523/130; 523/131; 536/90; 536/92; 536/97; 536/98; 252/8.513
[58] Field of Search ....................... 536/90, 92, 97, 98; 523/130, 131; 252/8.513, 8.511

[56] References Cited

U.S. PATENT DOCUMENTS

| | | | |
|---|---|---|---|
| 2,811,519 | 10/1957 | Touey | 536/91 |
| 4,110,226 | 8/1978 | Swanson | 252/8.56 |
| 4,507,474 | 3/1985 | Raehse et al. | 536/91 |
| 4,519,923 | 5/1985 | Hori et al. | 252/8.513 |

FOREIGN PATENT DOCUMENTS 63-182301  7/1988  Japan.
794098  1/1981  U.S.S.R..

*Primary Examiner*—Nathan M. Nutter
*Attorney, Agent, or Firm*—Sprung Horn Kramer & Woods

[57] ABSTRACT

Cellulose derivatives which are substituted in a specified manner by both carboxyalkyl groups and sulphoalkyl groups which are suitable in drilling fluids.

10 Claims, No Drawings

USE OF CELLULOSE DERIVATIVES IN DRILLING FLUIDS

This invention relates to the use of cellulose derivatives containing carboxyalkyl groups and sulphoalkyl groups CASAC in drilling fluids.

In deep well drilling, polymers are used in aqueous alkaline drilling fluids for reducing the water loss. This prevents the drilling fluid from flowing into permeable regions of the rock formation during the drilling process. Optimum discharge of the drilled rock from the bore hole is ensured by suitable flow properties of the drilling fluid.

The polymers used should maintain their viscosity and water binding capacity in the presence of electrolytes, especially alkali metal and alkaline earth metal salts, under the temperature conditions prevailing in the bore hole.

The products conventionally used for this purpose are carboxymethyl celluloses (CMC), starch derivatives and synthetic polymers (G. V. Chilingarian, P. Vorabutr: Developments in Petroleum Sci. 11, Elsevier Scientific Publishing Company, Amsterdam, 1981, Drilling and Drilling Fluids).

Synthetic products based on acrylic acids, acrylamides and their copolymers have the serious disadvantage that they have less stability in the presence of salts, especially in the presence of polyvalent ions. Synthetic polymers which are highly stable in the presence of polyvalent ions such as calcium and magnesium ions are very expensive and therefore frequently out of the question for economic reasons.

The synthetic copolymers described in PCT/EP 82/00264 and EP-A No. 0 152 814 contain polymerised sulphonic acid-containing monomers which play a decisive role in the stability in the presence of polyvalent ions but have the disadvantage of being very expensive.

Although starch derivatives are more stable in the presence of polyvalent ions such as calcium and magnesium, they have a lower temperature stability. Starch and starch derivatives are known to lose much of their activity at temperatures from 100° to 120° C. and thus become unusable.

The carboxymethyl celluloses (CMC) known from U.S. Pat. No. 2,425,768 have excellent properties for reducing the water loss in aqueous drilling fluids but have a limited stability in the presence of polyvalent ions such as calcium and magnesium. The preparation of pure sulphoethyl cellulose (SEC) has been described in U.S. Pat. No. 2,132,181. The sulphoethyl cellulose disclosed in U.S. Pat. No. 4,519,923 have the disadvantage that pure sulphoethyl celluloses are very expensive.

The use of carboxymethylsulphoethyl celluloses (CMSEC) as viscosity increasing agents for textile printing inks is described in SU No. 79 40 89 which claims the use of carboxy-methyl-sulphoethyl celluloses having a $DS_{carboxymethyl}$ of 0.4 to 0.55 and a $DS_{sulphoethyl}$ of 0.1 to 0.25 as viscosity forming agent in textile printing inks. The carboxymethylsulphoethyl celluloses disclosed in U.S. Pat. No. 2,811,519 have the disadvantage of inferior properties in drilling fluids and are therefore unsuitable for this purpose.

It was an object of the present invention to develop polymers which are stable to electrolytes and temperatures for improved drilling fluids. These polymers should also be economically suitable for use in highly saline drilling fluid systems in the presence of polyvalent cations and at temperatures of up to 160° C.

The invention relates to the use of cellulose derivatives containing carboxyalkyl and sulphoalkyl groups CASAC in drilling fluids, characterised in that 1. the average substitution per glucose unit with a carboxyalkyl group $DS_{CA}$ is from 0.4 to 1.8,
2. the average substitution per glucose unit with a sulphoalkyl group $DS_{SA}$ is from 0.1 to 1.0,
3. the sum of $DS_{CA}$ and $DS_{SA}$ is at least 0.9 and
4. the viscosity of a 2% by weight solution in distilled water at a shear velocity of 2.5 $sec^{-1}$ and a temperature of 20° C. is 5 to $50 \times 10^3$ mPa.s.

The carboxymethyl group is a particularly preferred carboxyalkyl group. The sulphoethyl group is a particularly preferred sulphoalkyl group. In a very preferred embodiment, the cellulose derivatives CASAC to be used according to the invention consist of a carboxymethylsulphoethyl cellulose CMSEC having an average substitution of sulphoethyl $DS_{SE}$ of from 0.1 to 1.0, in particular from 0.1 to 0.8 per glucose unit and an average substitution of carboxymethyl $DS_{CM}$ of from 0.4 to 1.8, in particular from 0.6 to 1.0. The compounds to be used according to the invention are used particularly in aqueous drilling fluids, in particular at concentrations in the range of from 0.1 to 4%, preferably from 0.5 to 3%, based on the quantity of water in the drilling fluid. In a preferred embodiment, the compounds to be used according to the invention are prepared by the etherification of cellulose in alkaline solution with at least one compound SA which transfers a sulphoalkyl group and at least one compound CA which transfers a carboxyalkyl group, characterised in that (a) cellulose is suspended, for example in the form of cellulose pulp, in particular in a secondary or tertiary alcohol,
(b) the suspension is combined with the compound SA and/or CA, preferably at a pH of 0 to 9,
(c) the suspension is then made alkaline, preferably to pH 13 to 14, in particular by the addition of alkali,
(d) etherification is carried out, in particular at a temperature from 55° to 100° C., and
(e) compound CA and/or SA is then optionally added if indicated, in particular at temperatures from 50° to 100° C. and pH 10 to 14 with the formation of a CASAC.

In another preferred embodiment, the compounds according to the invention are prepared by etherification of carboxyalkyl cellulose CAC in an alkaline solution with at least one compound SA which transfers a sulphoalkyl group, characterised in that (a) CAC is suspended, in particular in a secondary or tertiary alcohol,
(b) the suspension is combined with the compound SA, preferably at a pH of 0 to 9,
(c) the suspension is then made alkaline, preferably to pH 13 to 14, in particular by the addition of an alkali, and
(d) etherification is carried out, in particular at a temperature of from 55° to 100° C., with the formation of a CASAC.

The cellulose derivatives used according to the invention have a much greater stability to polyvalent ions such as calcium and magnesium than CMC. The products according to the invention also have the good temperature stability of carboxymethyl celluloses.

The viscosity of a given cellulose derivative to be used according to the invention depends on the requirements of the fluid system. For adjusting the water loss to below 10 ml (according to the API standard) or at elevated temperatures (140° to 160° C.), the more low viscosity cellulose derivatives are used. Low viscosity cellulose derivatives are understood for the purpose of the present invention to be cellulose derivatives which as 2% aqueous solutions at 20° C. have a viscosity below 1000 mPa.s at a shear velocity of 2.5 sec$^{-1}$. The concentration of such cellulose derivatives is preferably from 0.5 to 4, in particular from 1 to 3% by weight, based on the quantity of water present in the drilling fluid.

High viscosity cellulose ethers are used on account of their higher yield, in particular at lower temperatures, and for achieving a water loss of less than 15 ml according to the API standard. High viscosity cellulose derivatives are understood for the purpose of this invention to be cellulose derivatives which have a viscosity >1000 mPa.s as 2% by weight aqueous solutions at 20° C. and a shear velocity of 2.5 sec$^{-1}$. Such compounds are preferably used in quantities of from 0.1 to 2% by weight, in particular 0.5 to 1.5% by weight, based on the quantity of water present in the drilling fluid.

The cellulose derivatives used according to the invention result in drilling fluids which have excellent properties even in the presence of polyvalent ions (e.g. calcium$^{2+}$, magnesium$^{2+}$) at elevated temperatures (140° to 160° C.).

The products according to the invention may be used in all aqueous fluids which are used for sinking and treating bore holes and deep well holes, in particular in liquids which are required to ensure the stability of the bore hole during treatment of the latter and in liquids which serve to improve the flow paths for petroleum and natural gas by injection under high pressure (Fracing). The composition of these fluids may be completely different from those given in the examples.

The compounds to be used according to the invention may advantageously be prepared by the slurry process using, for example, the following as slurry medium: primary, secondary or tertiary alcohols such as methanol, ethanol, isopropanol or tertiary butanol or a mixture thereof. Other water miscible organic solvents may also be used, e.g. acetone. Celluloses other than that mentioned above may be used. The viscosity of the products may be adjusted as required by known methods of reducing or increasing the temperature or adding air, H$_2$O or other oxidising substances during or before alkalization. The reaction time and temperature during preparation may also be varied. The products obtained after washing are virtually free from low molecular weight impurities. The products still have a residual moisture content after they have been dried in air.

EXAMPLES

The properties of drilling fluids are measured and assessed according to the internationally recognised standards of the American Petroleum Institute (Standard Procedure for Testing Drilling Fluids, API RP 13 B, Sixth Edition, Apr. 1976, issued by the American Petroleum Institute, Production Department, 300 Carrigan Tower Building, Dallas, Texas 75201, USA).

The exact composition of the drilling fluid in mixed salt systems using low viscosity cellulose ethers according to the invention is shown in Table 1. The drilling fluids were subjected to various successive stresses in a roller furnace. The samples are aged at room temperature for 15 hours, then at 80° C. for 15 hours and finally at 140° C. for 15 hours. Table 1 shows the rheological data and water loss obtained after aging has been completed at 140° C. As seen from Table 1, the Examples according to the invention give very good results for water loss in the fluid system after aging. An ordinary commercial low viscosity carboxymethyl cellulose (CMC) is shown in Table 1 as comparison example.

Table 2a shows the exact composition of the drilling fluid when highly viscous cellulose ethers are used. The quantity of highly viscous cellulose ethers used (referred to as additive in the Table) is 1%. The samples were aged at room temperature for 15 hours and then at 80° C. for 15 hours. The data measured after aging at 80° C. are entered in Table 2b.

In Table 2b, Examples 10 and 11 show markedly lower water losses combined with good rheological properties compared with a commercial, highly viscous CMC representing the state of the art.

The components of the drilling fluids, bentonite and salt water drilling clay (SWDC) shown in Tables 1a and 2a conform to the quality requirements of the Oil Companies Material Association (OCMA) of Oct. 1973. SWDC conforming to OCMA DFCP 1 and bentonite conforming to OCMA DFCP 4 were used.

EXAMPLE 1

127.4 parts of finely milled (0.02 to 0.5 mm) bleached, refined pine sulphite cellulose are suspended in 2187 parts of isopropanol in a thermostatically controlled reactor with suitable stirrer under atmospheric air. 79.67 parts of a 51.3% solution of vinyl sulphonic acid sodium salt in water are added and the mixture is stirred for 15 minutes. 75.46 parts of sodium hydroxide dissolved in 106.7 parts of water are then added and the reaction mixture is alkalized for 80 minutes at 25° to 30° C. It is then heated to 70° C. within 60 minutes. The reaction temperature of 70° C. is maintained for 120 minutes (reaction time I). 110.81 parts of an 80% by weight solution of chloro-acetic acid in water are then added and the temperature is maintained at 70° C. for a further 90 minutes (reaction time II). The product is then filtered off and washed five times, each time with 2000 parts of a mixture of three parts of water and seven parts of methanol, and finally once with 2000 parts of pure methanol. The product is dried in air for 18 hours and ground. The product has the following data:

| | |
|---|---|
| Dry content = | 83.7% |
| DS$_{sulphoethyl}$ = | 0.287 |
| DS$_{carboxymethyl}$ = | 0.766 |
| Viscosity of a 2% solution in distilled H$_2$O = | 77 mPa · s. |

EXAMPLES 2 TO 9

Table 3 shows the conditions of preparation of Examples 1 to 13. These Examples were prepared analogously to Example 1 but part of the isopropanol was replaced by methanol in some of the Examples.

In Examples 2 to 9, addition of the solution of vinyl sulphonic acid sodium salt and addition of the sodium hydroxide were carried out at the time and temperature analogous to those of Example 1.

EXAMPLES 10 TO 11

Examples 12 and 13 were carried out analogously to Example 1. The pine sulphite cellulose was replaced by cotton linters.

The material data of the cellulose derivatives mentioned in the Examples are entered in Table 4.

TABLE 1

Behaviour of low viscosity cellulose derivatives in highly saline drilling fluids (according to API[1]).

TABLE 1a

Composition of the drilling fluid:

- 2% bentonite (according to OCMA[2] DFCP 4)
- 2% salt water drilling clay (according to OCMA DFCP 1)
- 3% additive (see below)
- 170 g/l NaCl
- 14 g/l KCl
- 100 g/l $CaCl_2.2H_2O$
- 10 g/l $MgCl_2.6H_2O$
- 3 g/l NaOH In Table 1b, Examples 1 to 8 show products according to the invention which have a very low water loss. For comparison, a commercial CMC and three CMSEC not according to the invention are shown. The water loss according to API is 60 ml for CMC and 14 ml, 13 ml and 16.5 ml, respectively, for comparison examples 9, 10 and 11. The water losses are thus substantially greater than 10 ml.

TABLE 1b

Properties of fluid after 15 hours aging at 140° C. in a roller furnace.

| Additive, Example No. | CMC | 1 | 2 | 3 | 4 | 5 | 6 | 7 | 8 | 9* | 10* | 11* |
|---|---|---|---|---|---|---|---|---|---|---|---|---|
| Apparent viscosity mPa.s | 25.5 | 14.5 | 23 | 13 | 15 | 17.5 | 27 | 17.5 | 21.5 | 14.5 | 12.0 | 15.5 |
| Plastic viscosity mPa.s | 15 | 12 | 21 | 12 | 13 | 16 | 21 | 14 | 18 | 11 | 11.0 | 13.0 |
| Yield Point lb/100 ft$^2$ | 21 | 5 | 4 | 2 | 4 | 3 | 12 | 7 | 7 | 7 | 2 | 5 |
| Fluid loss according to API ml | 60 | 6.4 | 3.6 | 4.4 | 4.9 | 2.5 | 3.2 | 5.1 | 3.2 | 14 | 13 | 16.5 |

[1]API = American Petroleum Institute, Standard Procedure for Testing Drilling Fluids, API RP 13 B, April 1976.
[2]OCMA = Oil Companies Material Association Specifications published by The Institute of Petroleum, London, issued by Heyden & Son, London, 1978.
*Comparison examples.

TABLE 2

Behaviour of highly viscous cellulose derivatives in highly saline drilling fluids (according to API[1]).

TABLE 2a

Composition of the drilling fluid:

- 2% Bentonite (according to OCMA[2] DFCP 4)
- 2% Salt water drilling clay
- 1% Additive (see below)
- 170 g/l NaCl
- 14 g/l KCl
- 100 g/l $CaCl_2.2H_2O$
- 10 g/l $MgCl_2.6H_2O$
- 3 g/l NaOH

TABLE 2b

Properties of fluid after 15 hours aging at 80° C. in a roller furnace

| Additive, Example No. | CMC | 12 | 13 |
|---|---|---|---|
| Apparent viscosity mPa.s | 54.5 | 36 | 36 |
| Plastic viscosity mPa.s | 20 | 20 | 25 |
| Yield point lb/100 ft$^2$ | 69 | 32 | 22 |
| Fluid loss according to API ml | 63 | 14 | 13 |

[1]API = American Petroleum Institute, Standard Procedure for Testing Drilling Fluids, API RP 13 B, April 1976
[2]OCMA = Oil Companies Material Association Specifications published by The Institute of petroleum, London. Issued by Heyden & Son, London, 1978.

TABLE 3

Data of Preparation of the Cellulose Ethers

| Example No. | iPrOH (parts) | MeOH (parts) | Cellulose (parts) | VSSNa Solution (parts) | Conc. of VSSNa Solution (% by weight) | NaOH (parts) | $H_2O$ (parts) | 80% by weight CES solution (parts) | Heating up time (Min) | Reaction time I (min) | Reaction time II (min) | Reaction temperature (°C.) | Atmosphere |
|---|---|---|---|---|---|---|---|---|---|---|---|---|---|
| 1 | 2.178 | — | 127.41 | 79.67 | 51.3 | 75.46 | 186.2 | 110.81 | 60 | 120 | 90 | 70 | air |
| 2 | 2.178 | — | 127.41 | 278.85 | 51.3 | 75.46 | 135.8 | 92.34 | 60 | 120 | 90 | 70 | air |
| 3 | 2.178 | — | 127.41 | 159.34 | 51.3 | 75.46 | 147.4 | 110.81 | 60 | 120 | 90 | 70 | air |
| 4 | 2.178 | — | 127.41 | 278.85 | 51.3 | 75.46 | 89.2 | 92.34 | 60 | 120 | 90 | 70 | $N_2$ |
| 5 | 2.178 | — | 127.41 | 159.34 | 51.3 | 75.46 | 147.4 | 110.81 | 60 | 120 | 90 | 70 | $N_2$ |
| 6 | 2.178 | — | 127.41 | 79.67 | 51.3 | 75.46 | 186.2 | 110.81 | 60 | 120 | 90 | 70 | $N_2$ |
| 7 | 2.143 | 47.71 | 127.41 | 101.16 | 30.3 | 62.88 | 113.6 | 92.3 | 30 | 30 | 90 | 70 | $N_2$ |
| 8 | 2.143 | 47.71 | 127.41 | 101.16 | 30.3 | 59.74 | 113.6 | 87.67 | 30 | 30 | 90 | 70 | $N_2$ |
| 9* | 2.143 | 47.54 | 127.41 | 40.5 | 30.3 | 56.6 | 189.7 | 83.1 | 60 | 60 | 60 | 70 | $N_2$ |
| 10* | 2.133 | 47.54 | 127.33 | 101.16 | 30.3 | 62.88 | 146.6 | 73.82 | 60 | 80 | 80 | 70 | $N_2$ |
| 11* | 2.133 | 47.54 | 127.33 | 67.44 | 30.3 | 62.88 | 170.1 | 83.1 | 60 | 80 | 80 | 70 | $N_2$ |
| 12 | 2.178 | — | 127.33 | 134.89 | 30.3 | 75.46 | 123.7 | 92.28 | 60 | 60 | 60 | 70 | $N_2$ |
| 13 | 2.178 | — | 127.33 | 202.34 | 30.3 | 75.46 | 76.7 | 101.51 | 60 | 60 | 60 | 70 | $N_2$ |

TABLE 4

Product data of the cellulose ethers

| Example No. | Dry Content (%) | Viscosity in 2% in dist. $H_2O$ (mPa.s) | DS Sulph-ethyl | DS Carboxy-methyl | DS Total |
| --- | --- | --- | --- | --- | --- |
| 1 | 83.7 | 77 | 0.31 | 0.81 | 1.12 |
| 2 | 83.6 | 45 | 0.54 | 0.64 | 1.18 |
| 3 | 83.3 | 59 | 0.53 | 0.74 | 1.27 |
| 4 | 80.3 | 127 | 0.8 | 0.48 | 1.28 |
| 5 | 82.8 | 148 | 0.48 | 0.79 | 1.27 |
| 6 | 80.1 | 175 | 0.26 | 0.86 | 1.18 |
| 7 | 80.2 | 338 | 0.16 | 0.81 | 0.97 |
| 8 | 81.3 | 350 | 0.16 | 0.77 | 0.93 |
| 9* | 87.8 | 411 | 0.02 | 0.7 | 0.72 |
| 10* | 86.6 | 789 | 0.15 | 0.64 | 0.79 |
| 11* | 85.5 | 445 | 0.09 | 0.71 | 0.8 |
| 12 | 84.11 | 39,058 | 0.24 | 0.72 | 0.96 |
| 13 | 85.36 | 31,677 | 0.34 | 0.74 | 1.18 |

*Comparison examples

We claim:

1. A drilling fluid comprising cellulose derivatives CASAC containing carboxyalkyl and sulphoalkyl groups wherein:
    1. the average substitution per glucose unit with a carboxyalkyl group $DS_{CA}$ is 0.4 to 1.8,
    2. the average substitution per glucose unit with a sulphoalkyl group $DS_{SA}$ is 0.1 to 1.0,
    3. the sum of $DS_{CA}$ and $DS_{SA}$ is at least 0.9 and
    4. the viscosity in a 2% by weight solution in distilled water at a shear velocity of 2.5 $sec^{-1}$ and a temperature of 20° C. is 5 to $50 \times 10^3$ mPa.s.

2. A drilling fluid according to claim 1, which is an aqueous drilling fluid.

3. A drilling fluid according to claim 1, wherein the cellulose derivatives are present in the drilling fluid at a concentration of from 0.1 to 4%, based on the quantity of water in the drilling fluid.

4. A drilling fluid according to claim 1, wherein the CASAC have a viscosity of <1000 mPa's and are present in the drilling fluid in a quantity of 0.5 to 4% based on the quantity of water present in the drilling fluid.

5. A drilling fluid according to claim 1, wherein the CASAC have a viscosity below 1000 mPa's and are present in the drilling fluid in a quantity of 0.1 to 2% based on the quantity of water in the drilling fluid.

6. A drilling fluid according to claim 1, wherein the carboxyalkyl group is a carboxymethyl group.

7. A drilling fluid according to claim 1, wherein the sulphoalkyl group is a sulphoethyl group.

8. A drilling fluid according to claim 1, wherein the CASAC is a carboxymethylsulphoethyl cellulose.

9. In the drilling for oil wherein there is utilized a drilling fluid containing a cellulose derivative, the improvement wherein said drilling fluid is a drilling fluid according to claim 1.

10. In the drilling for oil wherein there is utilized a drilling fluid containing a cellulose derivative, the improvement wherein said drilling fluid is a drilling fluid according to claim 8.

* * * * *